United States Patent
Sasaki et al.

(10) Patent No.: US 6,989,779 B2
(45) Date of Patent: Jan. 24, 2006

(54) SEMICONDUCTOR DEVICE HAVING DAC CHANNELS FOR VIDEO SIGNALS

(75) Inventors: Jun Sasaki, Kyoto (JP); Yasunori Kawamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 661 days.

(21) Appl. No.: 10/146,384

(22) Filed: May 14, 2002

(65) Prior Publication Data

US 2002/0171768 A1    Nov. 21, 2002

(30) Foreign Application Priority Data

May 18, 2001  (JP) ............................. 2001-150183
May 18, 2001  (JP) ............................. 2001-150184

(51) Int. Cl.
 H03M 1/66    (2006.01)
 H04N 5/21    (2006.01)
(52) U.S. Cl. ...................................... 341/144; 348/607
(58) Field of Classification Search ................ 341/141, 341/144; 348/607–630
See application file for complete search history.

(56) References Cited

U.S. PATENT DOCUMENTS

| 4,528,598 | A | * | 7/1985 | Trytko et al. ................ 348/712 |
| 4,531,149 | A | * | 7/1985 | Lewis, Jr. .................... 348/520 |
| 5,264,931 | A | * | 11/1993 | Yamada ....................... 348/720 |
| 6,285,717 | B1 | * | 9/2001 | Bahng et al. ........... 375/240.29 |
| 6,411,330 | B1 | * | 6/2002 | Purcell et al. ............... 348/180 |

FOREIGN PATENT DOCUMENTS

JP          61281696  A  * 12/1986

* cited by examiner

Primary Examiner—Howard L Williams
(74) Attorney, Agent, or Firm—Hogan & Hartson, LLP

(57) ABSTRACT

A semiconductor device has a multiplicity of DAC channels for performing digital-to-analog conversion of video signals. Signal processing means for delaying processing of signals by a predetermined delay time is provided in at least one DAC channel. The signal processing means functions as a phase inversion means to reduce cross talks between the DAC channels. The signal processing means also functions as a delay circuit to reduce voltage fluctuations in the power supply.

9 Claims, 6 Drawing Sheets

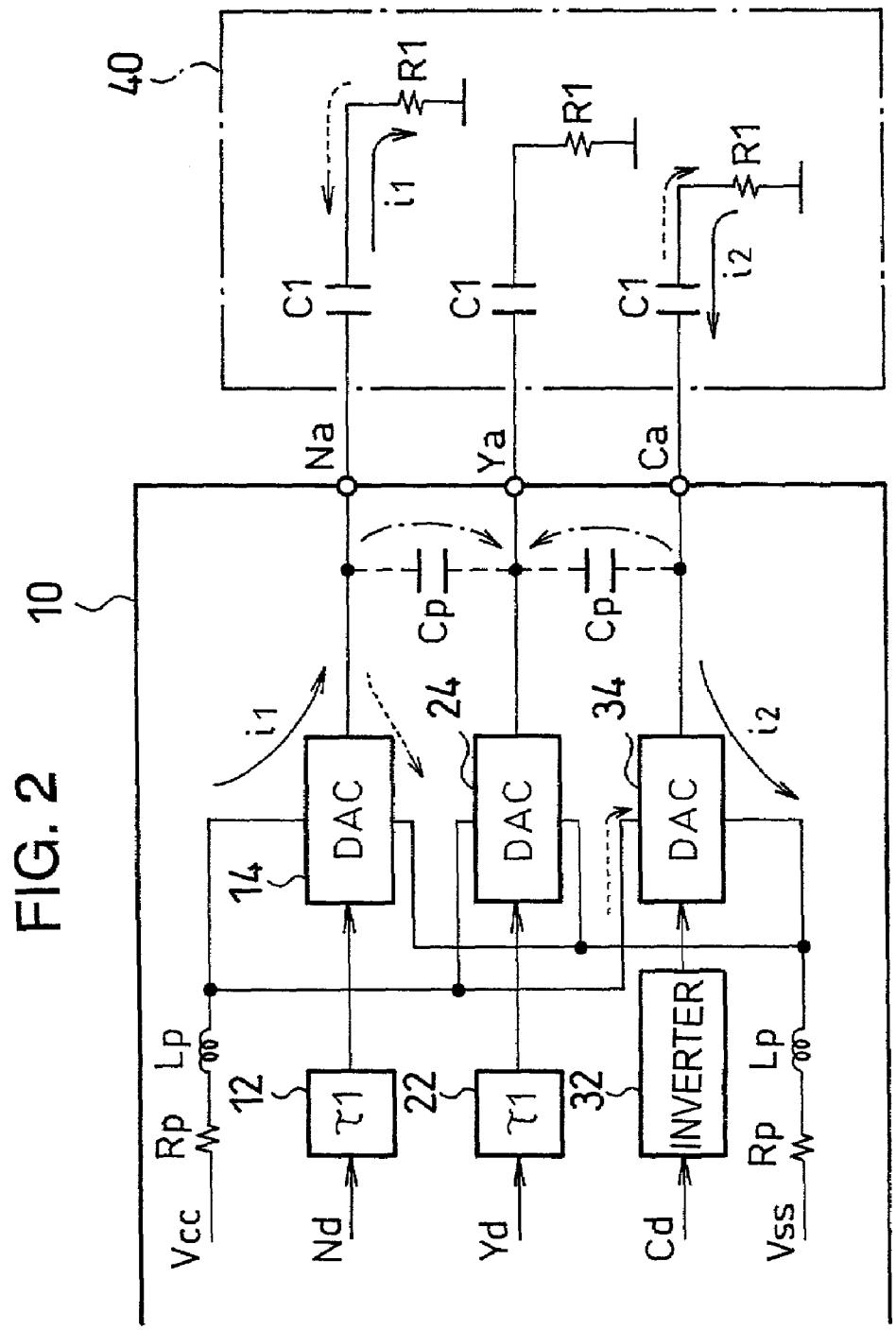

SEMICONDUCTOR DEVICE HAVING DAC CHANNELS FOR VIDEO SIGNALS

FIELD OF THE INVENTION

The invention relates to a semiconductor device having digital-to-analog converter (DAC) channels for video signals for use in digital TV sets, DVDs, and game machines.

BACKGROUND OF THE INVENTION

Conventional color TV signals such as a luminance signal Y, a chrominance subcarrier signal (hereinafter referred to as chrominance signal) C, and a synchronization signal are bundled in a composite color image signal (hereinafter referred to as composite signal) N. The luminance signal Y and the chrominance signal C contained in the composite signal are separated in each TV set. However, perfect separation of the luminance signal Y from the chrominance signal C is not easy, which therefore has been a major source of degradation of the image associated with them.

One approach to circumvent this problem in a DAC for a high-quality video signal processing in a digital TV for example is to provide two separate channels, one for the luminance signal Y and another for the chrominance signal C constituting a color TV signal, in addition to a channel for the conventional composite signal N, thereby forming a three-channel system, as is done in high-resolution VTR for S-image signal.

Chrominance signal C itself is a composite 2-color signal made up of a color difference signal R-Y for red (hereinafter referred to as signal U) and a color difference signal B-Y for blue (hereinafter referred to as signal V). The first color difference signal U, the second color difference signal V, and the luminance signal Y are often used as 3-channel color TV signals to improve the resolution of color TV signals.

Therefore, it is desirable for a semiconductor device having DACs in its video signal processing system that the DACs can be used in such high-resolution processing and in conventional processing as well. Thus, in recent years, 6 DACs are often provided in two separate groups with one group including three channels for luminance signal Y, composite signal N, and chrominance signal C, and another group including three channels for luminance signal Y, first color difference signal U, and second color difference signal V.

This allows a TV user to choose either group of channels in accordance to his preference.

However, such multi-channel system as mentioned above suffers cross talks between the channels, which causes degradation of picture quality, as discussed in detail below.

We first take a look at the first group of three channels, in which the chrominance signal C is used in the subcarrier wave (having 3.58 MHz in NTSC system, or 4.43 MHz in PAL system) to perform orthogonal phase modulation of the first color difference signal B-Y with the second color difference signal R-Y. Hence, energy density is high in the neighborhood of the subcarrier frequency. Then, parasitic capacitors Cp will be created between neighboring channels, since the three channels of DACs are integrated into an IC chip. Therefore, although the chrominance signal C and the luminance signal Y are separated, a cross talk inevitably arises between the luminance signal Y and the chrominance signal C on account of the parasitic capacitors Cp. Further, since the composite signal N in the other channel also includes a chrominance signal, the luminance signal Y is influenced by the cross talk with the chrominance signal in the composite signal N.

In this manner, luminance signal Y is influenced by the high-frequency components of the chrominance signals C in the two parallel neighboring channels, which results in additional cross talks that further degrades the picture quality.

In some cases, multiple loads are driven at the same time. For example, a CRT monitor and a video deck are used simultaneously, or multiplicity of monitors are simultaneously used. In such cases, the color TV signals consisting of the luminance signal Y and the chrominance signal C of the first three channels and the color TV signals in the composite signal N are simultaneously used, or the six channels in the first and the second groups are simultaneously used.

In these circumstances, a semiconductor device having multiple DAC channels must supply larger output currents to the multiple channels than normally expected. Furthermore, these currents change simultaneously that the power source of the IC chip suffers large current/voltage fluctuations, which can be also a source of degradation of picture quality.

SUMMARY OF THE INVENTION

It is therefore an object of the invention to provide a semiconductor device having a multiplicity of DAC channels for performing digital-to-analog (D/A) conversion of video signals, wherein the semiconductor device is adapted to prevent degradation of picture quality by the conversion.

It is another object of the invention to provide a semiconductor device having DACs for a composite signal channel, a luminance signal channel, and a chrominance signal channel, wherein cross talks from other channels to the luminance signal channel can be reduced to prevent degradation of picture quality by D/A conversions by the DACs.

It is a further object of the invention to provide a semiconductor device having DACs for a multi-channel video signal, wherein the semiconductor device is adapted to reduce fluctuations in supply voltage without significantly increasing the current supply capability of the power source for the device if a multiplicity of monitors for example are simultaneously used, thereby preventing degradation of picture quality due to the use of such multiple monitors.

A semiconductor device in accordance with an embodiment of the invention comprises: a multiplicity of DAC channels each having a DAC for a video signal, wherein at least one of said DAC channels includes means for processing said signal, said means having a predetermined delay time.

The multiplicity of DAC channels includes:
a composite DAC channel having a DAC for a composite signal;
a luminance DAC channel having a DAC for a luminance signal; and
a chrominance DAC channel having a DAC for a chrominance signal.

Said means for processing the signal may be a phase inversion means provided in said chrominance DAC channel. The phase inversion means may be a digital phase inversion circuit.

The composite DAC channel and/or the luminance DAC channel are/is provided with means for delaying the signal in the channel(s) by a time which corresponds to the delay time caused by said phase inversion means. The composite DAC channel and chrominance DAC channel are preferably arranged in symmetry with respect to the luminance DAC channel.

In this arrangement, cross talks between the luminance signal channel with the chrominance signal channel degrading picture quality can be canceled out by the cross talk with the composite signal channel.

In a case where all the three channels are simultaneously used, the two chrominance signals have opposite phases, so that output currents of the two channels cancel out. Accordingly, fluctuations in the supply voltage will be reduced.

A semiconductor device in accordance with another embodiment of the invention comprises: a multiplicity of DAC channels each having a DAC for a video signal, wherein DAC channels associated with one group of color signals include means for delaying the signal of the channel for a predetermined delay time.

The multiplicity of DAC channels may include: a composite DAC channel associated with a first group of color signals, said composite DAC channel having a DAC for a composite signal; a group of DAC channels associated with a second group of color signals, including a luminance DAC channel for a luminance signal and a chrominance DAC channel for a chrominance signal. The delay means may be provided in DAC channels associated with either the first or the second groups of color signals.

The multiplicity of DAC channels may include: a composite DAC channel associated with a first group of color signals, said composite DAC channel having a DAC for a composite signal; a group of DAC channels associated with a second group of color signals, including a luminance DAC channel for a luminance signal and a chrominance DAC channel for a chrominance signal; and a group of DAC channels associated with a third group of color signals including a second luminance DAC channel having a DAC for a second luminance signal, a first color difference DAC channel having a DAC for a red difference signal (first color difference signal), and a second color difference DAC channel having a DAC for a blue difference signal (second color difference signal). In this arrangement, the delay means includes first delay means having a first delay time and second delay means having a second delay time which is different from the first delay time; and the first delay means are provided in DAC channels associated with either one of said first through third groups of color signals, while the second delay means are provided in DAC channels associated with another group of color signals.

The multiplicity of DAC channels may have: a composite DAC channel associated with a first group of color signals and having a DAC for a composite signal; a group of DAC channels associated with a second group of color signals, including a luminance DAC channel for a luminance signal and a chrominance DAC channel for a chrominance signal; and a group of DAC channels associated with a fourth group of color signals and including a red DAC channel having a DAC for a red signal, a green DAC channel having a DAC for a green signal, and a blue DAC channel having a DAC for a blue signal. The delay means includes first delay means having a first delay time and second delay means having a second delay time which is different from said first delay time. The first delay means is provided in DAC channels associated with either one of said first, second, and fourth groups of color signals, while said second delay means is provided in DAC channels associated with another group of color signals.

In this arrangement, currents to be output to a load are delayed so as to reduce the fluctuations in the source voltage by delay means which are provided, in the video signal channels associated with luminance signals, to delay signal processing for predetermined times. Thus, degradation of picture quality will be prevented if more than one monitors are simultaneously used.

BRIEF DESCRIPTION OF THE DRAWINGS

FIG. 2 is a simplified circuit diagram of the embodiment of FIG. 1, showing the operations of the first embodiment.

DETAILED DESCRIPTION OF THE PREFERRED EMBODIMENTS

Figure 1:
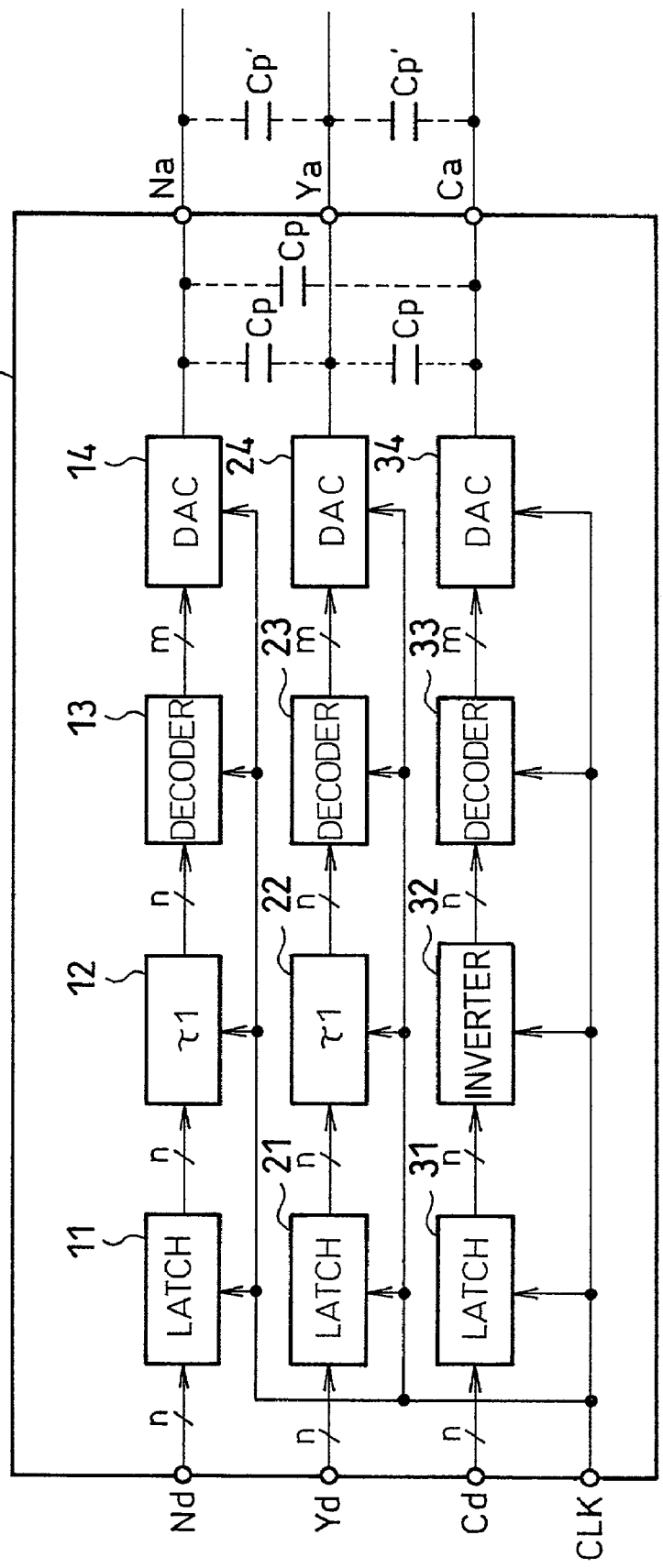
FIG. 1 is a block diagram representation of a semiconductor device having DAC channels according to a first embodiment of the invention.
Figure 3A:
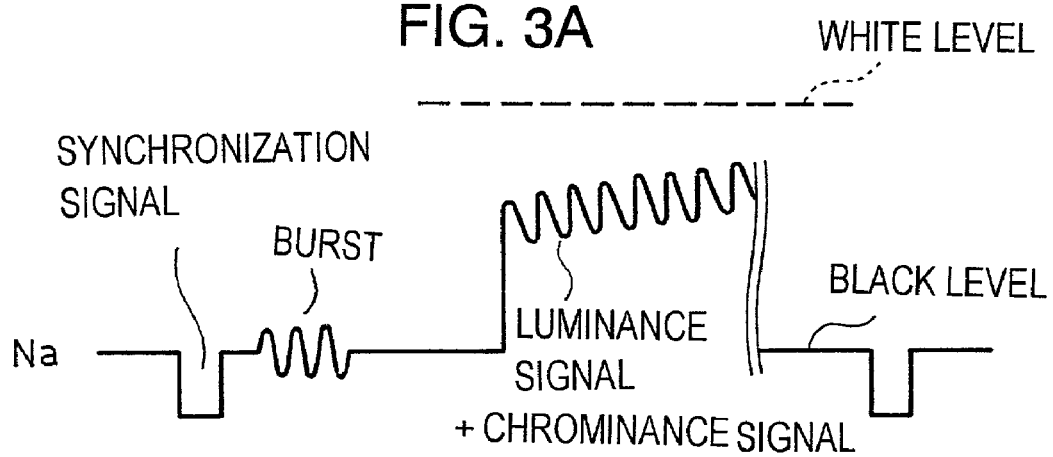
FIGS. 3A–3C show waveforms appearing in the circuit of FIG. 2.
Figure 3B:
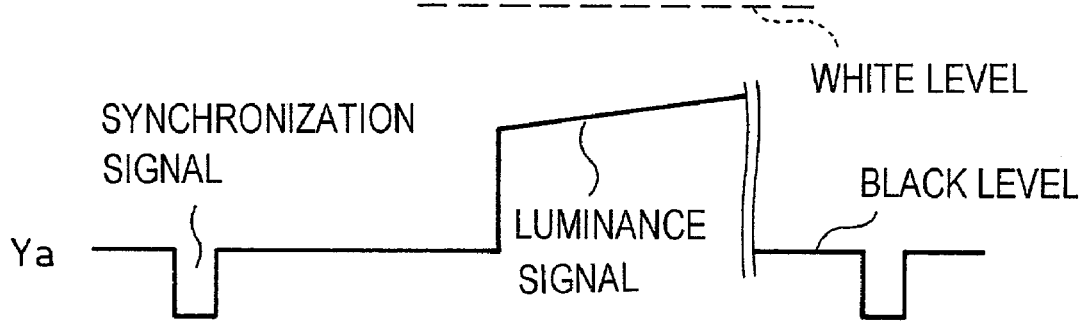
Figure 3C:
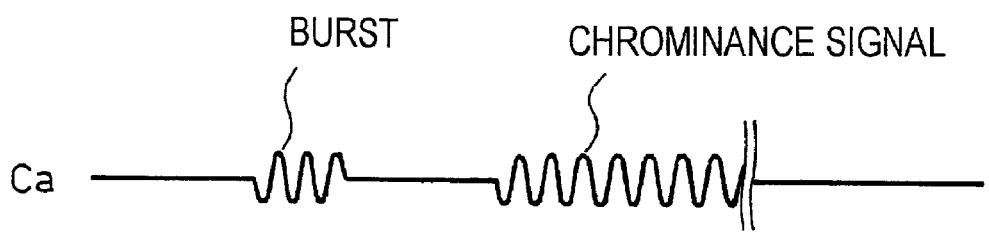

Referring now to FIG. 1, there is shown a section of a semiconductor device 10 relevant to DACs for video signals according to a first embodiment of the invention. Functions of the device are illustrated in the circuit diagram shown in FIG. 2. Waveforms appearing in the circuit are shown in FIGS. 3A–3C.

As shown in FIG. 1, an n-bit digital composite signal Nd in NTSC system or PAL system includes all the necessary signals for a color image, such as a luminance signal Y, a chrominance signal C for orthogonal phase modulations of a first color difference signal B-Y and a second color difference signal R-Y by a subcarrier wave (having a frequency of 3.58 MHz in NTSC system and 4.43 MHz in PAL system), and horizontal and vertical synchronization signals. It is assumed hereinafter that the number of bits n can be 10 for example, unless otherwise stated. In the example shown herein a digital luminance signal Yd includes horizontal and vertical synchronization signals. Digital chrominance signal Cd for performing orthogonal phase modulation of the first color difference signal B-Y and the second color difference signal R-Y by the subcarrier wave also includes a burst signal of the subcarrier wave.

Of these three channel digital signals Nd, Yd, and Cd, the digital luminance signal Yd and the digital chrominance signal Cd constitute one group of color signals. In this group the digital luminance signal Yd and the digital chrominance signal Cd are formed separately, so that a monitor receiving the grouped signals need not perform Y/C separation to obtain a picture of high quality. The digital composite signal Nd alone includes color signals.

Each of these 3-channels of signals, i.e. digital composite signal Nd, digital luminance signal Yd, and digital chrominance signal Cd, is formed from a set of color signals R, G, and B, timed to the same timing signal.

In the composite signal channel, the digital composite signal Nd is latched in a first latch circuit 11, delayed by a first delay circuit 12 by a delay time τ 1, decoded in a first decoder 13, and converted into an analog signal by a first DAC 14, resulting in an analog composite signal Na which is output from the semiconductor device 10. The decoder 13 is provided to decode an n-bit digital data into a predetermined m-bit codes suitable for the first DAC 14. Therefore, the decoder 13 may not be necessary unless it is required by the first DAC 14. This is the case in other channels.

In the luminance signal channel, the digital luminance signal Yd is latched in a second latch circuit 21, delayed by a second delay circuit 22 by the delay time τ 1, decoded by a second decoder 23, converted into an analog signal by a second DAC 24, and output from the semiconductor device 10 as an analog luminance signals Ya.

Similarly, in the chrominance signal channel, the n-bit digital chrominance signal Cd is latched in a third latch circuit 31, inverted in phase in a digital inversion circuit 32, decoded in a third decoder 33, converted into an analog format in a third DAC 34, and output from the semiconductor device 10 as an analog chrominance signal Ca.

The inversion circuit 32 is provided to invert the phases of all the signals contained in the digital chrominance signal Cd, including the burst of the subcarrier wave. Given that this phase inversion requires the delay time τ 1, the first delay circuit 12 and the second delay circuit 22 are set to have the same delay time τ 1 so that all the channels have the same timing.

A common system clock CLK is supplied to all the three channels.

Capacitors Cp shown in FIG. 1 represent parasitic capacitances between the respective channels of the first DAC 14, second DAC 24, and third DAC 34 in the semiconductor device 10. Similar parasitic capacitances Cp' are generated outside the semiconductor device 10.

A group of color signals consisting of the analog luminance signal Ya and the chrominance signal Ca generated as shown in FIG. 1 are supplied to a TV set or a monitor together with the color signal of the analog composite signal Na. Depending upon the analog color signals received, the TV set/monitor performs proper signal processing such as demodulation and RGB matrix processing of color signals to obtain R-G-B signals.

Operation of the first semiconductor device 10 shown in FIG. 1 will now be described with reference to FIGS. 2 and 3 illustrating a circuit structure of the device 10 and waveforms appearing in the circuit.

FIG. 2 briefly illustrates the circuit of the device with the decoders 13, 23, and 33 omitted for simplicity of illustration. It is seen in FIG. 2 that internal parasitic capacitors Cp exist between the respective output ends of the first DAC 14, second DAC 24, and third DAC 34 in the semiconductor device 10. There also exist similar external parasitic capacitors Cp' (not shown) outside the semiconductor device 10. Signals passing through the channels interfere with each other through these internal parasitic capacitors Cp and Cp'.

In what follows only internal parasitic capacitors Cp will be described, since external parasitic capacitors Cp' are essentially the same as the internal ones.

Equivalent circuits 40, each consisting of a resistor R1 and a capacitor C1, represent loads of the signal processing circuits of the device 10 as viewed from the respective output terminals of the analog composite signal Na, luminance signal Ya, and chrominance signal Ca. The resistor R1 typically has 75Ω, and the condenser C1 has a large capacitance to shut off the DC component of the signal. Driving power is supplied by power supply potential Vcc and reference potential Vss, which, however, structurally involve parasitic resistors Rp and parasitic inductors Lp.

As shown in FIG. 3, the analog luminance signal Ya includes a horizontal synchronization signal having a negative pulse level and a luminance signal having a positive level indicative of the luminance of a picture associated with it with reference to the black level (horizontal solid line), as shown in FIG. 3B. The upper limit of the luminance signal is indicated by a horizontal broken line representing the white level. The luminance signal actually varies in accordance with the level of luminance of the picture, which is, however, presently represented by a linearly increasing signal for simplicity. The analog chrominance signal Ca includes a subcarrier burst signal along with a chrominance signal for performing orthogonal phase-modulation of a first color difference signal B-Y and a second color difference signal R-Y by means of the subcarrier, as shown in FIG. 3C.

The analog composite signal Na includes: a horizontal synchronization signal having a negative pulse level with reference to the black level, a subcarrier wave burst signal, a luminance signal having a positive level indicative of the luminance of the picture associated with it, and a chrominance signal superposed on the luminance signal for performing orthogonal phase modulation of the first color difference signal B-Y and the second color difference signal R-Y by means of the subcarrier wave, as shown in FIG. 3A.

Thus, the analog composite signal Na is the sum of the analog luminance signal Ya and the analog chrominance signal Ca. However, since the digital chrominance signal Cd is inverted in phase by the digital inversion circuit 32, the analog chrominance signal Ca is out of phase by π with respect to the chrominance signal (i.e. burst signal plus chrominance signal) included in the analog composite signal Na. Although the phase of the analog chrominance signal Ca is inverted, it does not matter at all in the regeneration of the picture by a monitor, since the signal is again inverted in phase together with the burst signal used as the reference signal of color regeneration.

When the semiconductor device 10 is in operation, the digital composite signal Nd is delayed in the composite signal channel by a predetermined time (delay time) τ1 and converted by the first DAC 14 before it is provided as the analog composite signal Na. Similarly, the digital luminance signal Yd is delayed in the luminance signal channel by the predetermined delay time τ1 and converted by the second DAC 24 before it is provided as the analog luminance signal Ya. In the chrominance signal channel, the digital chrominance signal Cd is inverted in phase by the digital inversion circuit 32 and converted by the third DAC 34 before it is provided as the analog chrominance signal Ca.

The analog composite signal Na, analog luminance signal Ya, analog chrominance signal Ca then interfere with each other via the parasitic capacitors Cp. In particular, since subcarrier wave components (burst signal and chrominance signal) are contained in the analog composite signal Na and the analog chrominance signal Ca, these components tend to affect the analog luminance signal Ya as indicated by dotted lines shown in FIG. 2.

It should be noted, however, that the inventive analog chrominance signal Ca and the analog chrominance signal contained in the analog composite signal Na are made to have opposite phases. Hence, the cross talks of the chrominance signal Ca and the chrominance signal contained in the analog composite signal Na to the analog luminance signals Ya will cancel out, thereby reducing the cross talks to the luminance signal channel and preventing degradation of picture quality.

In order to better annihilate such cross talks, the composite signal channel and the chrominance signal channel are preferably arranged in symmetry in the semiconductor device 10 so that the influences of these channels to the luminance signal channel will oppose each other.

It is noted that although other interfering components are also contained in the analog luminance signal in the analog composite signal Na and in the luminance signal Ya, their influence is negligibly small.

In an event that the three channels for the luminance signal Y, chrominance signal C, and composite signal N are simultaneously used (for example in a case where a CRT monitor and a video deck are used, or a multiplicity of monitors are used), multiple loads are driven at the same time. In that event a larger output current is required than expected as the output currents for the respective loads, which simultaneously increase and decrease. Conventionally, such variation of the output currents has been a source of fluctuations in the power supply voltage of the IC, resulting in degradation of the picture quality.

It would be recalled that in the invention the analog chrominance signal Ca is inverted so that it has an opposite phase with respect to the analog chrominance signal contained in the analog composite signal Na. Hence, if the luminance signal Y, chrominance signal C, and composite signal N in the three channels are simultaneously used, the currents due to the analog chrominance signal Ca and the analog chrominance signal component will add up only destructively. Consequently, when one of these currents flows "out" of one channel, the other flows "into" the other channel, thereby reducing the fluctuations in supply voltage.

Looking more closely at the simultaneous operation of the channels with reference to FIG. 2, it is shown that a current i1 associated with the analog chrominance signal contained in the analog composite signal Na flows from the voltage supply Vcc into one of the equivalent load circuits 40 via the first DAC 14. At the same time, current i2 associated with the analog chrominance signal Na flows from another equivalent load circuit 40 to the reference potential Vss via the third DAC 34.

The fluctuations in the voltage supply Vcc (or reference potential Vss) is primarily due to the inductive voltage drop caused by the changes in the current through the parasitic inductor Lp, in addition to say the resistive voltage drop caused by the parasitic resistor Rp. The resultant voltage drop is given by $Rp(i1+i2)+Lp(di1/dt+di2/dt)$.

Thus, it becomes very large when the currents i1 and i2 flow in the same direction.

In actuality, however, in accordance with the invention, the currents i1 and i2 increase and decrease in the opposite directions as shown by solid and broken arrows in FIG. 2, so that the inductive voltage drops will cancel out each other, in addition to the decrease in the resistive voltage drop. Hence, the fluctuations in the supply voltage Vcc (or the reference potential Vss) will be greatly reduced accordingly, thereby improving the picture quality.

It has been assumed in the first embodiment above that the first delay circuit 12 and the second delay circuit 22 having the same delay time $\tau 1$ as the digital inversion circuit 32 are provided in the composite signal channel and luminance signal channel, respectively.

However, if $\tau 1$ is sufficiently short that the current i1 associated with the analog chrominance signal obtained in the analog composite signal Na and the current i2 associated with the analog chrominance signal Ca have a negligibly small phase difference, the first delay circuit 12 is not necessary and it can be omitted.

Since the chrominance signal Ca and the analog luminance signal together constitute a single color signal, they are preferably well timed with each other by the use of the second delay circuit 22. However, if the time $\tau 1$ needed for the inversion is small enough that the delay $\tau 1$ is permissible for the color image, the second delay circuit 22 can be also omitted.

Depending on the driving powers of the first DAC 14 through the third DAC 34, driver circuits can be provided at the respective output ends of the DACs to output the respective analog signals.

Figure 4:
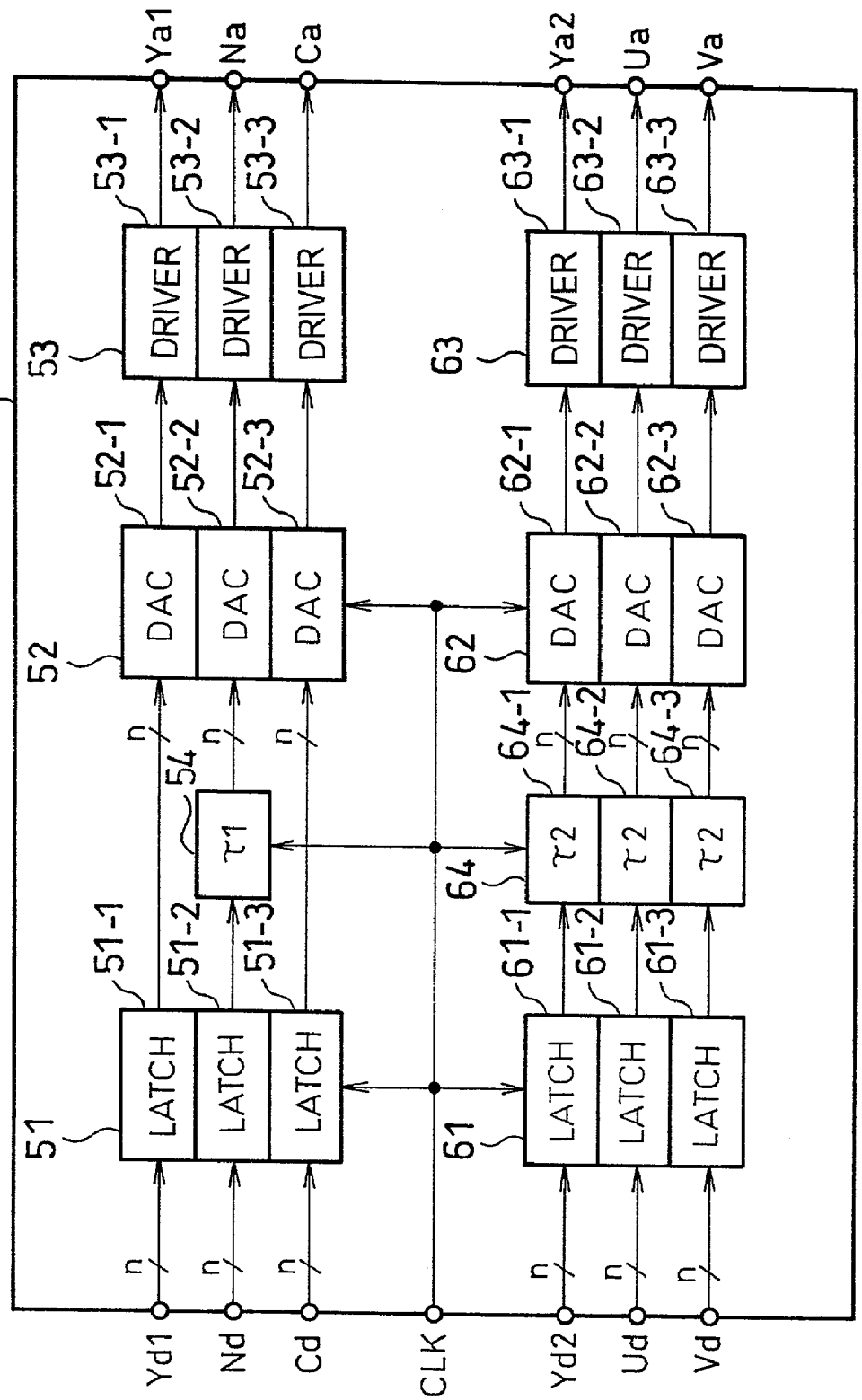
FIG. 4 is a block diagram representation of a semiconductor device having DAC channels according to a second embodiment of the invention.
Figure 5:
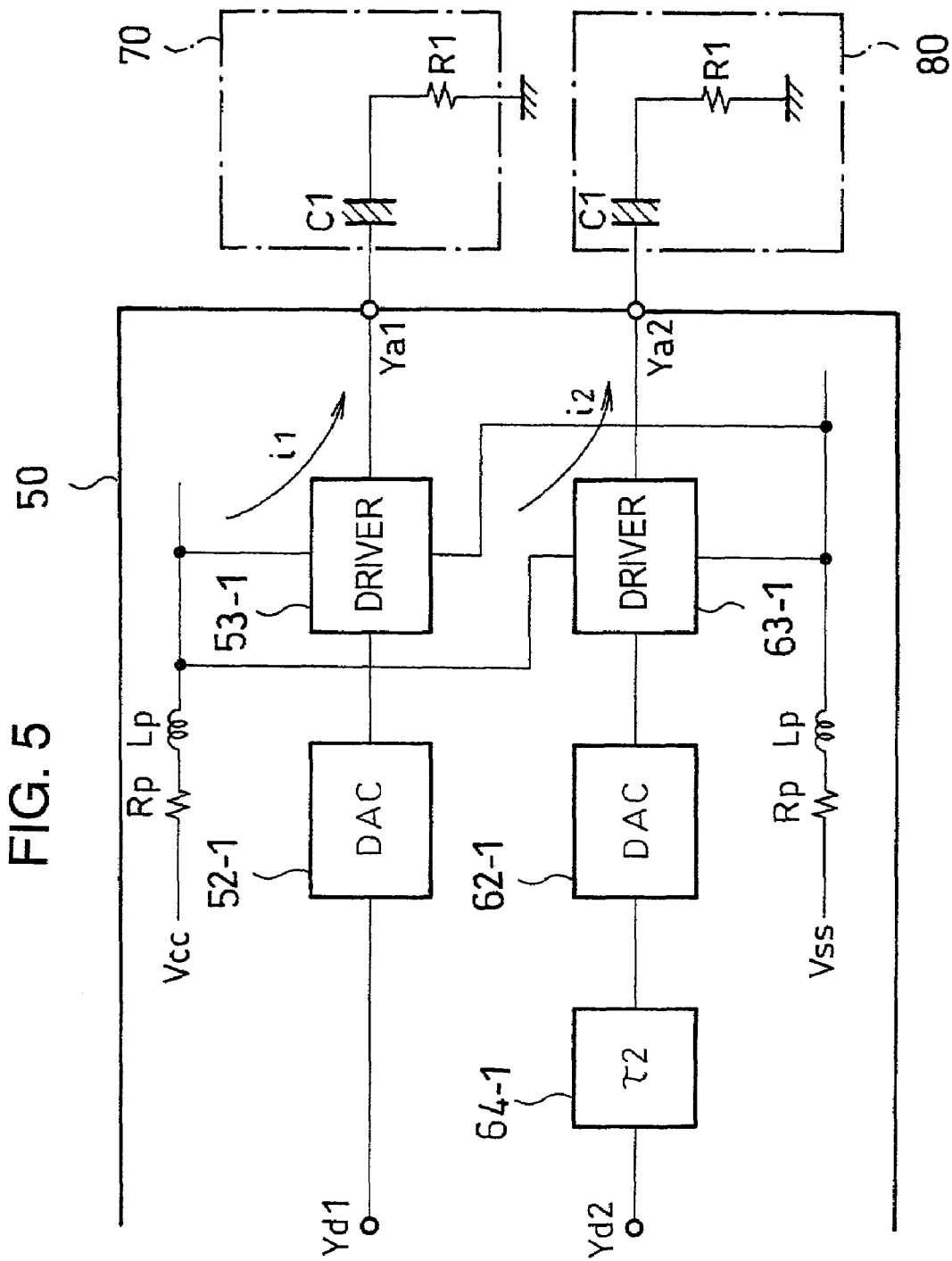
FIG. 5 is a simplified circuit diagram of the embodiment of FIG. 4, showing the operations of the second embodiment.
Figure 6A:
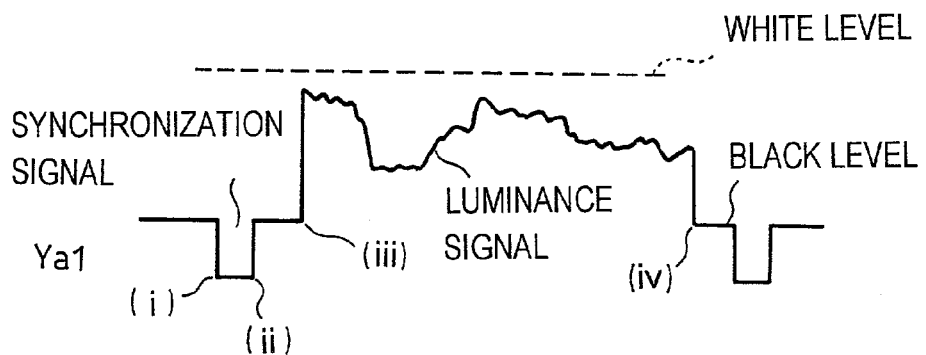
FIGS. 6A–6C show waveforms, appearing in the circuit of FIG. 5.
Figure 6B:
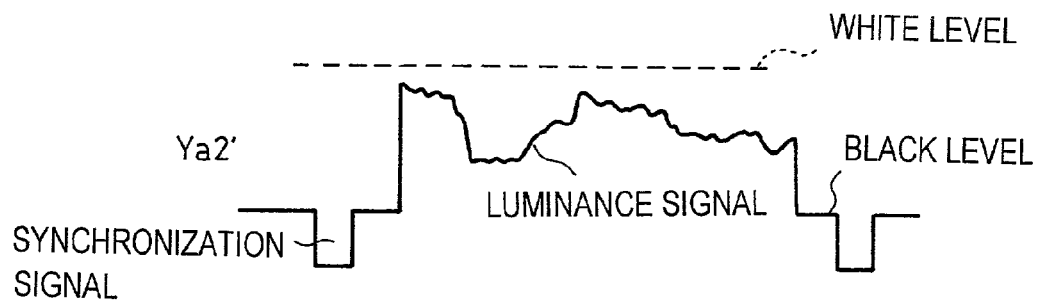
Figure 6C:
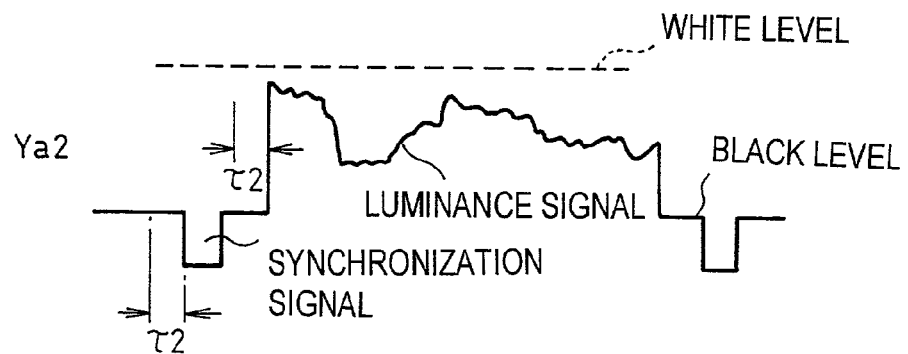

Referring to FIG. 4, there is shown a relevant portion of a second embodiment of a semiconductor device 50 having DACs according to the invention. FIG. 5 shows a circuit diagram illustrating functions of the device 50. FIGS. 6A–6C illustrate waveforms of analog signals generated by the device 50.

A first digital luminance signal Yd1, a digital composite signal Nd, a digital chrominance signal Cd, and a system clock CLK shown in FIG. 4 are the same as the corresponding signals shown in FIG. 1.

A second digital luminance signal Yd2 is the same as the first digital luminance signal Yd1. Together with the second digital luminance signal Yd2, a first digital color difference signal Ud (B-Y) and a second digital color difference signal Vd (R-Y) form a group of three color signals. In this group of color signals, the luminance signal is separately formed from the respective color difference signals that Y/C separation nor the separation of the chrominance signal is needed. Hence, a high resolution picture can be obtained from these signals.

Each of the 6-channel signals, that is, the digital luminance signal Yd1, digital composite signal Nd, digital chrominance signal Cd, second digital luminance signal Yd2, first digital color difference signal Ud, and second digital color difference signal Vd, is formed from a set of R, G, and B signals. They are timed to the same timing signal.

Of these six channel signals, the first three are latched in a first group 51 of latch circuits 51-1–51-3, converted into analog signals in a first group 52 of DACs (52-1–52-3) before they are output as a first analog luminance signal Ya1, an analog composite signal Na, and an analog chrominance signal Ca, respectively, via a first group 53 of drivers (53-1–53-3), respectively.

In the channel for the digital composite signal Nd, a first delay circuit 54 for delaying the signal by a predetermined time $\tau 1$ is provided between the latch circuit 51-2 and the DAC 52-2. This delay results in a time difference $\tau 1$ between the group of color signals consisting of the first analog luminance signal Ya1 and the analog chrominance signal Ca and the group of other analog signals in the analog composite signal Na.

In the second three channels, digital signals are latched in a second group 61 of latch circuits (61-1–61-3), delayed by a predetermined time $\tau 2$ by a second group 64 of delay circuits (64-1–64-3), converted into analog signals in a second group 62 of DACs (62-1–62-3), before they are output as a second analog luminance signal Ya2, an analog first color difference signal Ua, and an analog second color difference signal Va, respectively, via a second group 63 of drivers (63-1–63-3), respectively. The delay time $\tau 2$ is set to be different from $\tau 1$. Incidentally, if the delay times $\tau 1$ and $\tau 2$ are set equal, concurrent current variations increase in the channels. However, if this is permissible, the delay circuits can be omitted.

In this arrangement, the second analog luminance signal Ya2, analog first color difference signal Ua, and analog second color difference signal Va can be used to construct a group of color signals which differ in timing from the group of signals consisting of the first analog luminance signal Ya1 and chrominance signal Ca by $\tau 2$, and from the color signals in the analog composite signal Na by $\tau 2-\tau 1$. The delay times $\tau 1$, $\tau 2$, and the delay time difference $\tau 2-\tau 1$ are preferably very large to enjoy the merits of the invention, which can be attained by increasing the areas of the delay circuits. However, in determining optimum delay times, a compromise must be made between this preference and minimization requirements of the IC.

In the arrangement shown in FIG. 4, the group of color signals consisting of the first analog luminance signal Ya1 and analog chrominance signal Ca, the group of color signals consisting of second analog luminance signal Ya2, analog first color difference signal Ua, and analog second color difference signal Va, and the group of color signals in the analog composite signal Na are fed to the TV set or monitor. In the TV set or monitor, adequate signal processing such as demodulation of the color signals and RGB matrix processing are performed in accordance with the color signals received to obtain R, G, and B signals.

Operations of the second embodiment of a semiconductor device 50 having DACs will now be described with reference to FIGS. 5 and 6 showing respectively the function of the circuit and waveforms appearing in the circuit. Shown in FIGS. 5 and 6 are two typical channels for the first digital luminance signal Yd1 and the second digital luminance signal Yd2 to illustrate the functions of the DACs.

As shown in FIG. 5, circuits 70 and 80 representing first and second loads, respectively, are the equivalent circuits of the load as viewed from the output terminals of the first analog luminance signal Ya1 and the second analog luminance signal Ya2, respectively. Each of the loads is represented by an equivalent condenser C1 and an equivalent resistor R1. The resistor R1, condenser C1, supply voltage Vcc, reference potential Vss, parasitic resistors Rp, and parasitic inductors Lp are the same as the corresponding elements shown in FIG. 2.

As shown in FIG. 6A, the first analog luminance signal Ya1 includes a horizontal synchronization signal having a negative pulse level and a luminance signal having a positive level in accordance with the luminance of the picture frame of interest, with reference to the black level. The upper limit of the luminance signal is the "WHITE" level as indicated by a horizontal broken line. FIG. 6B shows a conventional second analog luminance signal Ya2' obtained when the second delay circuit 64-1 is not provided. This signal has the same waveform and timing as the first analog luminance signal Ya1. FIG. 6C shows the second analog luminance signal Ya2 of the invention, which has the same waveform as the first analog luminance signal Ya1 but is delayed in timing by $\tau 2$ by the second delay circuit 64-1 as compared with the first analog luminance signal Ya1.

When the first driver 53-1 is in operation, a current i1 flows from the voltage supply Vcc to the first equivalent load circuit 70 via the output terminal for the first analog luminance signal Ya1. Similarly, when the second driver 63-1 is in operation, a current i2 flows from the voltage supply Vcc to the second equivalent load circuit 80 via the output terminal for the second analog luminance signal Ya2. These current i1 and i2 create voltage drops across the parasitic resistors Rp and parasitic inductors Lp. Because of the voltage drops, the drivers 53-1 and 63-1 and other drives (not shown) suffer changes in the supply voltage applied to them. Similar changes take place as the current i1 and i2 are absorbed by the reference potential Vss.

If the timing of the second luminance signal Ya2 were identical to that of the first luminance signal Ya1 shown in FIG. 6A, as for the luminance signal Ya2' shown in FIG. 6B, there would be concurrent voltage drops by the two parasitic inductors Lp. In other words, the voltage drop would be then $$Vo=Rp(i1+i2)+Lp(di1/dt+di2/dt)$$

which would be exceedingly large when current i1 and i2 changed at the same time.

In the invention, however, the timings of the first and the second analog luminance signals Ya1 and Ya2, respectively, are offset with each other by a delay time of $\tau 2$ as shown in FIG. 6C to avoid concurrent voltage drops. As a result, the inductive voltage drops due to i1 and i2 is much smaller than Vo given above.

Particularly, the analog luminance signal undergoes drastic changes at a rise/fall of the synchronization signal and at the start/end of a line. But since these changes are offset in time in the first and the second analog luminance signals Ya1 and Ya2, respectively, the inductive voltage drops are reduced accordingly.

Since the superposed luminance level is also reduced, the voltage drops are expected to reduce accordingly.

Since the fluctuations in the supply voltage are reduced in the manner as described above, deterioration of picture quality can be suppressed even if a multiplicity of monitors are used simultaneously.

In the example shown in FIGS. 5 and 6, operations of the color signal channels are described by way of typical example with reference to the first analog luminance signal Ya1 and second analog luminance signal Ya2. Although other signals, i.e. the analog chrominance signal Ca, analog first color difference signal Ua, analog second color difference signal Va and analog composite signal Na, have different waveforms, they initiate and terminate a current at the start and the end of the respective signals irrespective of their waveforms. The loads for the channels for the signals, represented by the equivalent load circuit 70, are all the same complying with a national standard of TVs and monitors. Consequently, color signal channels which include the channels for the chrominance signal Ca, analog first color difference signal Ua, analog second color difference signal Va and analog composite signal Na also have similar functions as those for the first analog luminance signal Ya1 and second analog luminance signal Ya2 described above.

It would be apparent to a person skilled in the art that the first delay circuit 54 and second group 64 of delay circuits are not limited to the channels shown in FIG. 4, but that they can be provided in any two of the three groups of color signals: a first group consisting of the first digital luminance signal Yd1 and digital chrominance signal Cd, a second group contained in the composite signal Nd, and a third group consisting of the first digital luminance signal Yd1, digital first color difference signal Ud, and second color difference signal Vd.

The delay circuits may be of analog type provided in the output sections of the first group of DACs 52 and the second group of DACs 62 in place of the first delay circuit 54 and second group of delay circuits 64. In this case, clocks to the respective delay circuits are not necessary.

In cases where the first group of DACs 52 and the second group of DACs 62 have sufficient driving power, the first and the second groups of drivers 53 and 63, respectively, may be omitted, and the outputs of the DACs may be directly provided as the analog outputs of the semiconductor device 50.

Alternatively, a single set of color signals Rd, Gd, and Bd may be used in place of the group of color signals consisting of the second digital luminance signal Yd2, digital first color difference signal Ud, and digital second color difference signal Vd.

We claim:

1. A semiconductor device, comprising:
a multiplicity of DAC channels each having a DAC for a video signal, wherein
at least one of said DAC channels includes means for processing said video signal, said means having a predetermined delay time;
wherein said multiplicity of DAC channels include:
a composite DAC channel having a DAC for a composite signal,
a luminance DAC channel having a DAC for a luminance signal, and
a chrominance DAC channel having a DAC for a chrominance signal,
wherein said means for processing a signal is a phase inversion means provided in said chrominance DAC channel;
wherein said phase inversion means is a digital phase inversion circuit;
wherein said composite DAC channel is provided with means for delaying the signal of the channel by a time which corresponds to the delay time caused by said phase inversion means;
wherein said composite DAC channel and chrominance DAC channel are arranged in symmetry with respect to said luminance DAC channel.

2. A semiconductor device, comprising:
a multiplicity of DAC channels each having a DAC for a video signal, wherein
at least one of said DAC channels includes means for processing said video signal, said means having a predetermined delay time;
wherein said multiplicity of DAC channels include:
a composite DAC channel having a DAC for a composite signal,
a luminance DAC channel having a DAC for a luminance signal, and
a chrominance DAC channel having a DAC for a chrominance signal,
wherein said means for processing a signal is a phase inversion means provided in said chrominance DAC channel;
wherein said phase inversion means is a digital phase inversion circuit; and
wherein said composite DAC channel and the luminance DAC channel are provided with means for delaying the signals of the respective channels by a time which corresponds to the delay time caused by said phase inversion means.

3. The semiconductor device according to claim 2, wherein said composite DAC channel and chrominance DAC channel are arranged in symmetry with respect to said luminance DAC channel.

4. A semiconductor device, comprising:
a multiplicity of DAC channels each having a DAC for a video signal, wherein
at least one of said DAC channels includes means for processing said video signal, said means having a predetermined delay time;
wherein said means for processing said signal is delay means for delaying said signal and is provided in DAC channels associated with at least one group of color signal;
wherein said multiplicity of DAC channels include:
a composite DAC channel associated with a first group of color signals and having a DAC for a composite signal;
a group of DAC channels associated with a second group of color signals, including a luminance DAC channel for a luminance signal and a chrominance DAC channel for a chrominance signal.

5. The semiconductor device according to claim 4, wherein said delay means is provided in DAC channels associated with either said first or second groups of color signals.

6. A semiconductor device, comprising:
a multiplicity of DAC channels each having a DAC for a video signal, wherein
at least one of said DAC channels includes means for processing said video signal, said means having a predetermined delay time;
wherein said means for processing said signal is delay means for delaying said signal and is provided in DAC channels associated with at least one group of color signals;
wherein said multiplicity of DAC channels include:
a composite DAC channel associated with a first group of color signals and having a DAC for a composite signal;
a group of DAC channels associated with a second group of color signals and including a luminance DAC channel for a luminance signal and a chrominance DAC channel for a chrominance signal; and
a group of DAC channels associated with a third group of color signals and including a second luminance DAC channel having a DAC for a second luminance signal, a first color difference DAC channel having a DAC for a red difference signal (first color difference signal), and a second color difference DAC channel having a DAC for a blue difference signal (second color difference signal).

7. The semiconductor device according to claim 6, wherein
said delay means includes first delay means having a first delay time and second delay means having a second delay time which is different from said first delay time; and
said first delay means is provided in DAC channels associated with either one of said first through third groups of color signals, white said second delay means is provided in DAC channels associated with another group of color signals.

8. A semiconductor device, comprising:
a multiplicity of DAC channels each having a DAC for a video signal, wherein
at least one of said DAC channels includes means for processing said video signal, said means having a predetermined delay time;
wherein said means for processing said signal is delay means for delaying said signal and is provided in DAC channels associated with at least one group of color signals;
wherein said multiplicity of DAC channels include:
a composite DAC channel associated with a first group of color signals and having a DAC for a composite signal;

a group of DAC channels associated with a second group of color signals, including a luminance DAC channel for a luminance signal and a chrominance DAC channel for a chrominance signal; and a group of DAC channels associated with a fourth group of color signals and including a red DAC channel having a DAC for a red signal, a green DAC channel having a DAC for a green signal, and a blue DAC channel having a DAC for a blue signal.

9. The semiconductor device according to claim 8, wherein said delay means includes first delay means having a first delay time and second delay means having a second delay time which is different from said first delay time; and said first delay means is provided in DAC channels associated with either one of said first, second, and fourth groups of color signals, while said second delay means is provided in DAC channels associated with another group of color signals.

* * * * *